(12) United States Patent
Nauka et al.

(10) Patent No.: US 12,246,377 B2
(45) Date of Patent: Mar. 11, 2025

(54) POWDER BED MATERIALS

(71) Applicant: HEWLETT-PACKARD DEVELOPMENT COMPANY, L.P., Spring, TX (US)

(72) Inventors: Krzysztof Nauka, Palo Alto, CA (US); Seongsik Chang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 111 days.

(21) Appl. No.: 16/603,315

(22) PCT Filed: Jan. 2, 2018

(86) PCT No.: PCT/US2018/012051
§ 371 (c)(1),
(2) Date: Oct. 7, 2019

(87) PCT Pub. No.: WO2019/135732
PCT Pub. Date: Jul. 11, 2019

(65) Prior Publication Data
US 2020/0324338 A1    Oct. 15, 2020

(51) Int. Cl.
*B22F 1/052* (2022.01)
*B22F 1/06* (2022.01)
(Continued)

(52) U.S. Cl.
CPC ................ *B22F 1/052* (2022.01); *B22F 1/06* (2022.01); *B22F 10/14* (2021.01); *B22F 10/28* (2021.01);
(Continued)

(58) Field of Classification Search
CPC ........ B22F 2207/13; B22F 1/06; B22F 10/28; B22F 1/052; B22F 10/14; B22F 10/16; B22F 10/37; B33Y 10/00; C22F 1/052
See application file for complete search history.

(56) References Cited

U.S. PATENT DOCUMENTS 5,382,308 A   1/1995   Bourell et al.
7,070,734 B2  7/2006   Liu et al.
(Continued)

FOREIGN PATENT DOCUMENTS

CA   2695764 A1   4/2009
CN   104903029 A  9/2015
(Continued)

OTHER PUBLICATIONS

Seyda et al. Investigation of aging processes of Ti—6Al—4V powder material in laser melting. Physics Procedia 39 (2012) 425-431. (Year: 2012).*
(Continued)

*Primary Examiner* — Paul A Wartalowicz
*Assistant Examiner* — Stephani Hill
(74) *Attorney, Agent, or Firm* — Dierker & Kavanaugh, P.C.

(57) ABSTRACT

The present disclosure is drawn to powder bed materials. The powder bed material can include from 20 wt % to 95 wt % of a large particulate metal and from 5 wt % to 80 wt % of a small particulate metal. The large particulate metal can have a D50 particle size distribution value ranging from 20 µm to 100 µm and an average aspect ratio from 1:1 to 1.1:1. The small particulate metal can have a D50 particle size distribution value ranging from 1 µm to 15 µm and an average aspect ratio from greater than 1.1 to 2.1.

13 Claims, 5 Drawing Sheets

(51) Int. Cl.
*B22F 10/14* (2021.01)
*B22F 10/28* (2021.01)
*B22F 10/34* (2021.01)
*B22F 10/36* (2021.01)
*B22F 12/43* (2021.01)
*B33Y 70/00* (2020.01)
*B33Y 10/00* (2015.01)

(52) U.S. Cl.
CPC .............. *B22F 10/34* (2021.01); *B22F 10/36* (2021.01); *B22F 12/43* (2021.01); *B33Y 70/00* (2014.12); *B33Y 10/00* (2014.12)

(56) References Cited

U.S. PATENT DOCUMENTS

| | | | |
|---|---|---|---|
| 2005/0249628 A1* | 11/2005 | Hsu | F16C 33/62 419/37 |
| 2006/0199309 A1* | 9/2006 | Sommer | H01L 23/3732 423/446 |
| 2006/0263690 A1* | 11/2006 | Suhara | H01M 4/525 429/231.6 |
| 2009/0047165 A1 | 2/2009 | Syvanen et al. | |
| 2014/0295087 A1 | 10/2014 | Rickenbacher et al. | |
| 2015/0321255 A1* | 11/2015 | Colin | B33Y 10/00 219/76.12 |
| 2015/0321355 A1* | 11/2015 | Kishi | A61B 34/30 606/130 |
| 2016/0086715 A1* | 3/2016 | Lin | H01F 27/00 336/221 |
| 2016/0175929 A1* | 6/2016 | Colin | C04B 35/62839 219/76.12 |
| 2016/0193696 A1* | 7/2016 | McFarland | B23K 26/342 219/76.12 |
| 2016/0199911 A1* | 7/2016 | Dave | B22F 10/85 419/53 |
| 2016/0200045 A1* | 7/2016 | Hopkins | C04B 35/547 428/550 |
| 2016/0279703 A1* | 9/2016 | Clare | C23C 4/06 |
| 2016/0339517 A1 | 11/2016 | Joshi et al. | |
| 2017/0008082 A1 | 1/2017 | Chen | |
| 2017/0072471 A1 | 3/2017 | Welch et al. | |
| 2017/0252804 A1 | 9/2017 | Hanni et al. | |
| 2017/0252974 A1 | 9/2017 | Ng et al. | |
| 2017/0348770 A1* | 12/2017 | Kwon | B22F 10/34 |
| 2018/0369909 A1* | 12/2018 | Ibe | B22F 1/148 |
| 2019/0271068 A1* | 9/2019 | Sungail | B22F 1/142 |
| 2019/0344339 A1* | 11/2019 | Sumi | B22F 1/065 |

FOREIGN PATENT DOCUMENTS

| | | | |
|---|---|---|---|
| CN | 106794623 A | 5/2017 | |
| DE | 102007052198 B3 * | 4/2009 | ............ B22F 1/0003 |
| JP | 2005-200734 A | 7/2005 | |
| JP | 2017025392 A | 2/2017 | |
| RU | 2021881 C1 | 10/1994 | |
| WO | WO-2004096469 A1 * | 11/2004 | ............ B22F 1/0003 |
| WO | WO-2007039450 A1 | 4/2007 | |
| WO | 2015/056230 A1 | 4/2015 | |
| WO | 2016/152023 A1 | 9/2016 | |
| WO | WO-2017110829 A1 * | 6/2017 | ............ B22F 1/0014 |
| WO | 2017/131760 A1 | 8/2017 | |
| WO | 2017/178084 A1 | 10/2017 | |
| WO | WO-2017178319 A1 * | 10/2017 | ............ B22F 3/1021 |
| WO | WO-2018123052 A1 * | 7/2018 | ................ B22F 1/00 |

OTHER PUBLICATIONS

ASTM E562-11 (Year: 2011).*
Gong et al. Influence of small particles inclusion on selective laser melting of Ti—6Al—4V powder. IOP Conf. Series: Materials Science and Engineering 272 (2017) 012024 (Year: 2017).*
Rahaman. Sintering Basics. ASM Handbook. vol. 7, Powder Metallurgy. 2015. ASM International. 205-236. (Year: 2015).*
DE 102007052198 machine translation (Year: 2009).*
Farzadfar et al. Impact of IN718 bimodal powder size distribution on the performance and productivity of laser powder bed fusion additive manufacturing process. Powder Technology 375 (2020) 60-80. (Year: 2020).*
A review on recent developments in binder jetting metal additive manufacturing materials and process characteristics.
Bowen P; "Particle Size Distribution Measurement from Millimeters to Nanometers and from Rods to Platelets", Journal of Dispersion Science and Technology, Taylor and Francis Group, Jan. 1, 2002, pp. 631-662, vol. 23, No. 5.
Truong Duo et. al. ;"Process Development Towards Full Density Stainless Steel Parts with Binder Jetting Printing", International Journal Of Machine Tools & Manufacture, 12 (2017) 50-60.
Yun Bai et al, Effect of Bimodal Powder Mixture on Powder Packing Density and Sintered Density in Binder Jetting of Metals, p. 758-771, p. 764, table 2, Hallollexo B 14HTepi4eT—http://sffsymposium.engr.utexas.edu/sites/default/files/2015/2015-62-Bai.pdf.

* cited by examiner

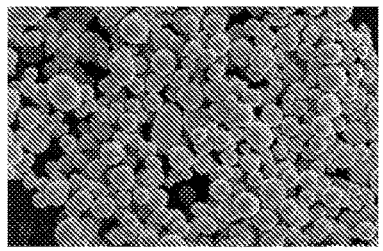 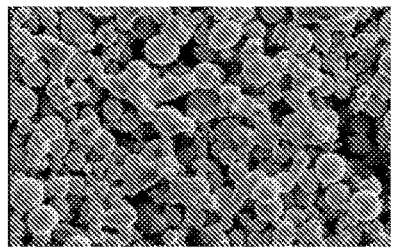 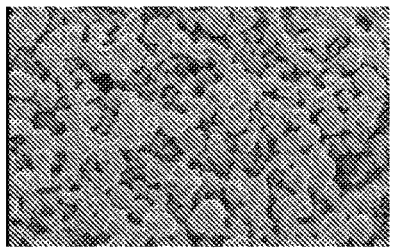
FIG. 4A  FIG. 4B  FIG.4C
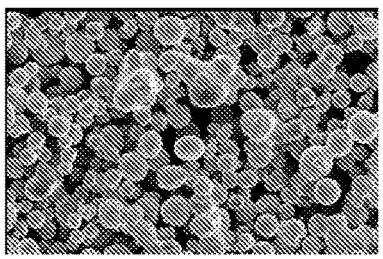 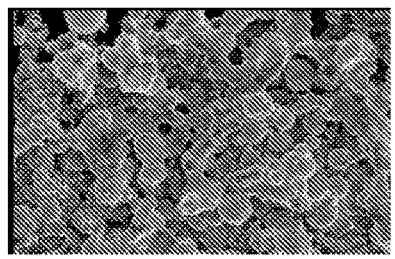 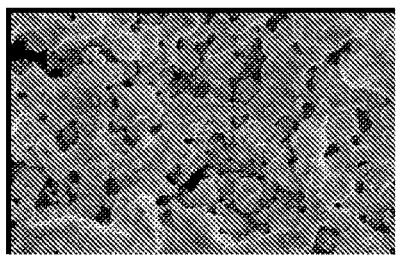
FIG. 4D  FIG. 4E  FIG.4F

POWDER BED MATERIALS

BACKGROUND

Three-dimensional printing, otherwise known as "3D printing," involves processes by which a printer transforms materials into a three-dimensional physical object. Methods of 3D printing have continued to develop over the last few decades and include, but are not limited to include, powder bed and liquid printing, selective laser sintering, selective laser melting, electron beam melting, as well as others. The area of powder bed and liquid printing is growing and evolving. The demand for new techniques and materials for powder bed and liquid printing has increased as the area continues to expand and evolve.

BRIEF DESCRIPTION OF DRAWINGS

Additional features and advantages of the disclosure will be apparent from the detailed description that follows, which taken in conjunction with the accompanying drawings illustrates, by way of examples, features of the present technology. It should be understood that the figures are representative of examples of the present disclosure and should not be considered as limiting the scope of the disclosure.

FIG. 4A presents an example flash fused specimen based on energy applied to large particulate metal powder bed material;

FIG. 4B presents an example flash fused specimen based on energy applied to blend of 90% large particulate metal and 10% small particulate metal powder bed material in accordance with the present disclosure;

FIG. 4C presents an example flash fused specimen based on energy applied to a blend of 50% large particulate metal and 50% small particulate metal powder bed material in accordance with the present disclosure;

FIG. 4D presents an example flash fused specimen based on energy applied to large particulate metal powder bed material;

FIG. 4E presents an example flash fused specimen based on energy applied to a blend of 90% large particulate metal and 10% small particulate metal powder bed material in accordance with the present disclosure;

FIG. 4F presents an example flash fused specimen based on energy applied to a blend of 50% large particulate metal and 50% small particulate metal powder bed material in accordance with the present disclosure;

Figure 1:
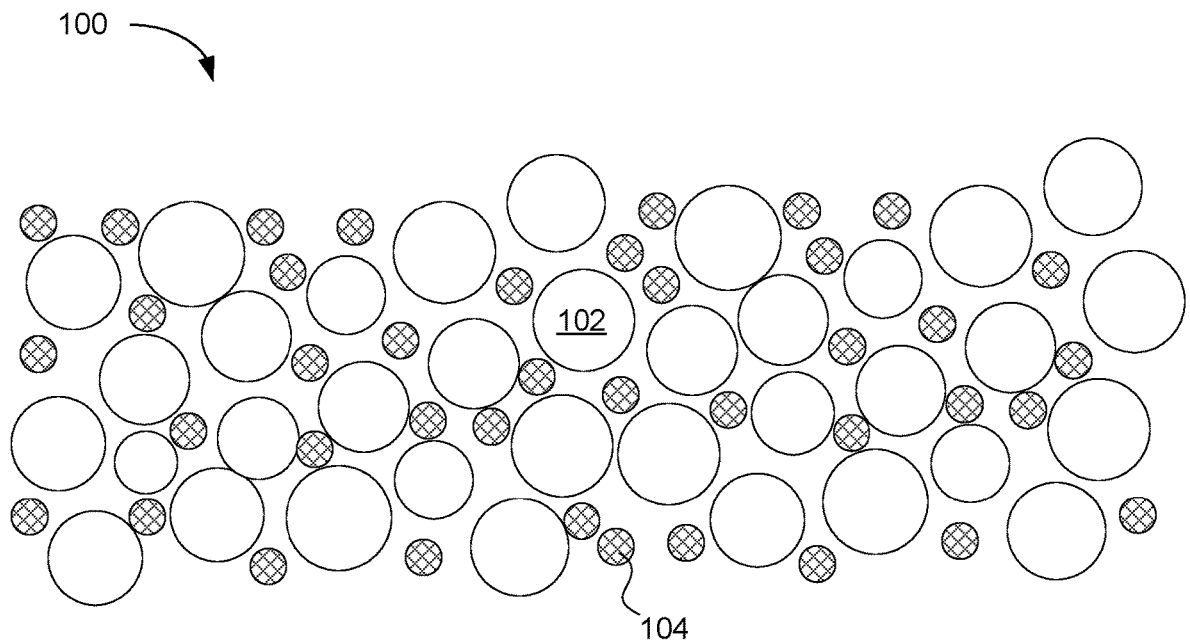
FIG. 1 schematically displays an example powder bed material in accordance with the present disclosure.

DETAILED DESCRIPTION 3D printing of metal articles can involve heating metal powder in order to sinter or melt metal powder providing a fused layer and/or article. For example, in photonic fusion, a type of 3D printing, top layer metal particles can become irradiated by an intense pulse of visible light. The absorbed pulse energy can be converted to heat, increasing the temperature of some of the metal particles and sintering or melting those particles. The particles adjacent to the sintered or melted particles can be heated to a lesser degree. The difference in the temperature at the respective particles within the irradiated layer can be due to the presence of a printed fluid at one of the locations, e.g., enhancing heat or reducing heat due to the presence of the fluid.

Quasi spherical gas particles produced by metal atomization can be easily spread at a controlled thickness layer enabling a layer-by-layer 3D printing process. Reducing particle size can make powder spreading difficult because gravity driven smooth particle flow can become disrupted by various forms of the inter-particle interactions, for example static charges, friction opposing movement, etc. However, small particles may use a lower irradiation energy liquefying their outer portions, fusing particles together through merging of the molten portions of the particles. Therefore, mixture of particles with different sizes may combine the ease of powder spreading with better particle fusing.

Furthermore, by using particles having size profiles of different sized, e.g., relative large metal particles admixed with relative smaller metal particles, heat conduction between the particles and/or differences in heat convection through gasses filling the spaces in between the particles can provide lower heating profiles compared to using the relative large metal particles alone. With only larger particles, heating can be more non-uniform and post irradiation cooling can also be non-uniform, often resulting newly fused metal layers becoming deformed. Deformation can result in complications during subsequent spreading of the powder bed material, making layer by layer printing of metal particles impossible. In addition, thermal stress within the article formed by 3D printing can be a function of the energy delivered by the pulse of visible light; accordingly, an articled formed by a lower pulse energy can often exhibit less thermal stress than an article formed by a higher pulse energy.

In accordance with this, the present disclosure relates generally to powder bed materials. In one example, a powder bed material can include from 20 wt % to 95 wt % of a large particulate metal that can have a D50 particle size distribution value ranging from 20 µm to µm and average aspect ratio ranging from 1:1 to 1.1:1. The powder bed material can also include from 5 wt % to 80 wt % of a small particulate metal that can have a D50 particle size distribution value ranging from 1 µm to 15 µm and an average aspect ratio greater than 1.1 to 2:1. In one example the large particulate metal can be present at from 55 wt % to 75 wt % and the small particulate metal can be present at from 25 wt % to 45 wt %. In another example, the large particulate metal can have a D10 particle size distribution from 10 µm to 30 µm, and can have a D90 particle size distribution from 35 µm to 75 µm and the small particulate metal can have a D10 particle size distribution from 0.1 µm to 10 µm and can have a D90 particle size distribution from 10 µm to 25 µm. In yet another example, the large particulate metal and the small particulate metal can independently be aluminum, titanium, copper, cobalt, chromium, nickel, vanadium, tungsten, tungsten carbide, tantalum, molybdenum, magnesium, silicon, gold, silver, stainless steel, steel, alloys thereof, or admixtures thereof. In a further example, the large particulate metal can be an elemental metal. In another example, the large particulate metal and the small particulate metal can be different.

A material set is also described herein in some detail. In one example, the material set can include a powder bed material and a fluid. The powder bed material can include from 20 wt % to 95 wt % of a large particulate metal that can have a D50 particle size distribution value ranging from 20 μm to μm, and can include from 5 wt % to 80 wt % of a small particulate metal that can have a D50 particle size distribution value ranging from 1 μm to 15 μm. The fluid can be operable to be applied to the powder bed material in order to provide selective fusing properties to a first portion of the powder bed material in contact with the fluid relative to a second portion of the powder bed material not in contact with the fluid. In one example, the fluid can include a reflective additive, an absorptive additive, or a combination thereof. In another example the first portion of the powder bed and the fluid can be irradiated by a light source having a pulse energy 15 $J/cm^2$ to 50 $J/cm^2$ and can be positioned within 5 mm to 150 mm away from the powder bed, following irradiation the first portion can become fused together and the second portion can remain unfused. In another example, the second portion of the powder bed and the fluid can be irradiated by a light source having a pulse energy 15 $J/cm^2$ to 50 $J/cm^2$ and positioned within 5 mm to 150 mm away from the powder bed, the first portion can be fused together and the second portion can remain unfused. In yet another example, when one of the first portion or the second portion are fused, and the other of the first portion or the second portion remain unfused, a layer of a 3-dimensional part can be formed that can have a fused cross-sectional area ranging from 30% to 100%.

A three-dimensional printing system can include a powder bed material, a powder bed, a fluid ejector, and a light source. The powder bed material can include from 20 wt % to 95 wt % of a large particulate metal that can have a D50 particle size distribution value ranging from 20 μm to μm, and can include from 5 wt % to 80 wt % of a small particulate metal that can have a D50 particle size distribution value ranging from 1 μm to 15 μm. The powder bed can be for receiving the powder bed material. The fluid ejector can be operable to selectively deposit a fluid onto the powder bed material contained in the powder bed. The light source can generate a pulse energy that can be sufficient to sinter a portion of the large particulate metal as well as sinter or melt a portion of the small particulate metal. In one example, the pulse energy can be from 15 $J/cm^2$ to 50 $J/cm^2$, and the light source can be positioned within 5 mm to 150 mm away from the powder bed during operation. In another example, the fluid can include a reflective additive, an absorptive additive, or a combination thereof.

In further detail regarding the powder bed material, the material set, and the 3D printing system, and as shown by example in FIG. 1, the powder bed material specifically can include a large particulate metal and a small particulate metal 104. By including two different sized particulate metals in the powder bed material, the material can allow for non-uniform heating such that the outer layer of a large particulate metal can melt while the inner core of the large particulate metal may remain cool enough to retain their shape. At the same time, the small particulate metal can be sintered or melted more uniformly throughout the bulk of the particles, contributing to metal flow that can connect the un-melted cores of the large particulate metal. In addition, the inclusion of the small particulate metal can allow fusion of the layer and/or article to occur utilizing a lower pulse energy, and thus the associated thermal stress of the fused layer and/or article can be lower.

Figure 2:
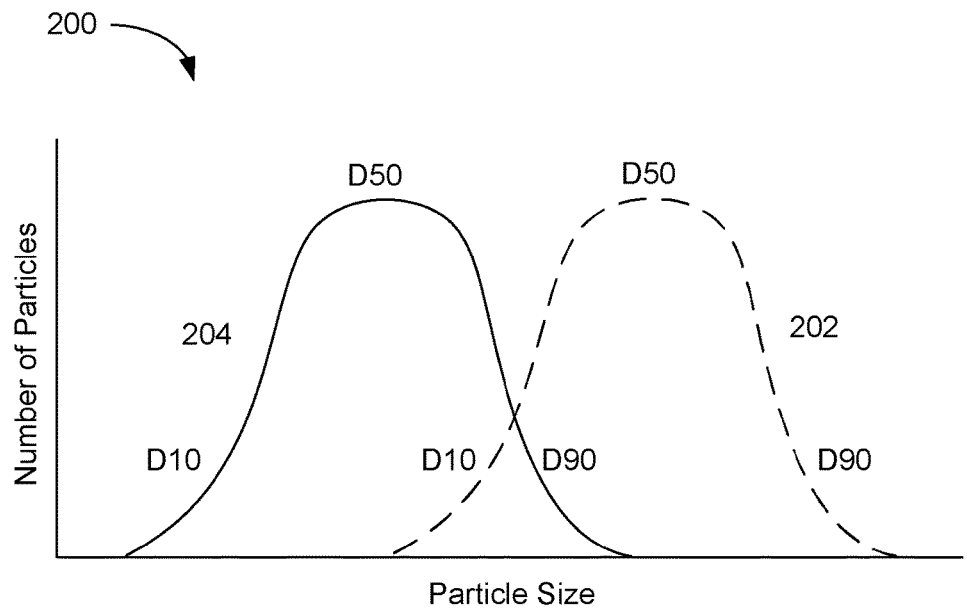
FIG. 2 schematically displays an example Gaussian distribution curve of an example powder bed material in accordance with the present disclosure.

The large particulate metal can provide flowability to the powder bed material and can reduce deformation of the fused layers. The shape type of the particles can be spherical, irregular spherical, rounded, semi-rounded, discoidal, angular, subangular, cubic, cylindrical, or any combination thereof. In one example, the large particulate metal can include spherical particles, irregular spherical particles, rounded particles, other particle shapes that have an aspect ratio from 1.1:1 to 1:1, or a combination thereof. In some examples, the type of the shape of the particles can be uniform or substantially uniform, which can allow for uniform melting or sintering of the particulates in the large particulate metal during heating. The particle size distribution can also vary. As used herein, particles size refers to the value of the diameter of spherical particles or in particles that are not spherical the longest dimension of that particle. The particle size can be presented as a Gaussian distribution or a Gaussian- like distribution (or normal or normal-like distribution). Gaussian-like distributions are distribution curves that may appear essentially Gaussian in distribution curve shape, but which can be slightly skewed in one direction or the other (toward the smaller end or toward the larger end of the particle size distribution range). An exemplary Gaussian distribution 200 of the large particulate metal 202 and of the small particulate metal 204, with respect to their relation to one another, is shown in FIG. 2. In this example, the "D10," "D50," and "D90" particle size distribution values refer to the particle sizes along the Gaussian distribution curves shown, based on particle sizes related to the $10^{th}$ percentile, $50^{th}$ percentile, and the $90^{th}$ percentile size. For example, a D50 value of 25 μm means that 50% of the particles have a particle size greater than 25 μm and 50% of the particles have a particle size less than 25 μm. A D10 value of 10 μm means that 10% of the particles are smaller than 10 μm and 90% are larger than 10 μm. A D90 value of 50 μm means that 90% of the particles are smaller than 50 μm and 10% are larger than 50 μm. Particle size distribution values are not necessarily related to Gaussian distribution curves, but in one example of the present disclosure, the large particulate metal and the small particulate metal can have a Gaussian distribution, or more typically a Gaussian-like distribution, with multiple offset peaks shown at D50 in the two respective curves, but which also have portions of the curves that may be overlapping (as shown in FIG. 2), or alternatively, with distribution curves that may not overlap (not shown). An exemplary Gaussian-like distribution is shown in Example 1, where the particle size difference from D50 to D90 is slightly different than the particle size distribution from D50 to D10. In practice, true Gaussian distributions are not typically present, as some skewing typically is present in practice, but still, the Gaussian-like distribution can still be considered to be essentially referred to as "Gaussian" as used conventionally in practice.

In one example, the large particulate metal can have a D50 particle size distribution value that can range from 20 μm to μm. In other examples the large particulate metal can have a D50 particle size distribution value that can range from 20 μm to 60 μm, from 25 μm to 45 μm or from 40 μm to 55 μm. In one example, the D10 particle size distribution value can range from 10 μm to 30 μm or 15 μm to 25 μm. In another example, of the D90 particle size distribution value can range from 35 μm to 75 μm or from 50 μm to μm.

The weight percentage of the large particulate metal can also vary. The inclusion of more large particulate metal in the powder bed material can assist in flowability of the powder bed material and can reduce the deformation of the fused layer or fused article. Thus, in one example the large particulate metal can be present at from 20 wt % to 95 wt % of the powder bed material. In yet other examples, the large particulate metal can be present at from 40 wt % to 85 wt %, or from 55 wt % to 75 wt %.

The composition of the large particulate metal can also vary. In one example, the large particulate metal can be aluminum, titanium, copper, cobalt, chromium, nickel, vanadium, tungsten, tungsten carbide, tantalum, molybdenum, magnesium, silicon, gold, silver, stainless steel, steel, alloys thereof, or admixtures thereof. In another example, the large particulate metal can be stainless steel. In some examples the large particulate metal can be an elemental metal. In some examples, the large particulate metal can include particulates that are different types of metals, e.g., combinations of two types of metals that may both be within the particle size distribution described herein for large particulate metals, but which may have Gaussian or Gaussian-like distribution within those particle size distribution profiles that are different.

Turning now to the small particulate metal. The small particulate metal can be sintered or partially or completely melted at a lower pulse energies and/or durations relative to the large particulate metal. Therefore, the inclusion of the small particulate metal in the powder bed material can allow for a printed article that may exhibit less thermal stress. The shape type of the particles can be spherical, irregular spherical, rounded, semi-rounded, discoidal, angular, subangular, cubic, cylindrical, or any combination thereof. In one example, the small particulate metal can include spherical particles, irregular spherical particles, or a combination thereof. In some examples, the type of the shape of the particles can be uniform or substantially uniform, which can allow for uniform melting or sintering of the particulates in the large particulate metal during heating. In some examples the shape type of the small particulate metal and the large particulate metal can be the same. In one example, the average aspect ratio of the small particulate metal can be greater than 1.1:1 to 2:1.

The particle size distribution can also vary. In one example, the small particulate metal can have a D50 particle size distribution value that can range from 1 μm to 15 μm. In other examples the small particulate metal can have a D50 particle size distribution value that can range from 5 μm to 15 μm, from 10 μm to 15 μm or from 5 μm to 9 μm. In another example, the D10 particle size distribution value can range from 0.1 μm to 10 μm or 1 μm to 5 μm. In yet another example, the D90 particle size distribution value can range from 10 μm to 25 μm or from 15 μm to 20 μm. In some examples, all or substantially all of the small metal particles can have an average particle size equal to or less than 20 μm.

The weight percentage of the small particulate metal can also vary and in some instances can benefit balancing of the benefits. On one hand, the inclusion of greater than 5 wt % of the small particulate metal in the powder bed material can lower the energy used to fuse the powder bed material and thus reduce the thermal stress of the formed layer or article. On the other hand, the inclusion of larger quantities, more than 60 wt %, of the small particulate metal can cause the powder bed material not to flow and make the powder bed material difficult to spread layer by layer. In accordance with this, in one example the small particulate metal can be present at from 5 wt % to 80 wt % in the powder bed material. In yet other examples, the small particulate metal can be present at from 15 wt % to 60 wt %, or from 25 wt % to 45 wt %.

The composition of the small particulate metal can also vary and can be aluminum, titanium, copper, cobalt, chromium, nickel, vanadium, tungsten, tungsten carbide, tantalum, molybdenum, magnesium, silicon, gold, silver, stainless steel, steel, alloys thereof, or admixtures thereof. In some examples, the small particulate metal can be stainless steel. In other examples the small particulate metal can be a different metal than the large particulate metal. This can allow for the formation of an alloy when each layer of the article is formed. In some examples, the small particulate metal can include particulates that are different types of metals, e.g., combinations of two types of metals that may both be within the particle size distribution described herein for small particulate metals, but which may have Gaussian or Gaussian-like distribution within those particle size distribution profiles that are different.

With respect to the combination of the large particulate metal and the small particulate metal the weight ratio of these particulates can vary. For example, the ratio of the large particulate metal to the small particulate metal can range from 2:8 to 9:1. In other examples the weight ratio of the large particulate metal to the small particulate metal can range from 1:1 to 9:1; from 1:1 to 6:1; from 2:1 to 5:1; from 1:1.15 to 9:1; from 1:1.15 to 1:3; from 3:2 to 2:3; from 1:1.22 to 1:1.7; or from 0.75:1 to 1:2.

Varying the weight ratio of the large particulate metal to the small particulate metal can allow for a shift in the pulse energy used to fuse the article in order to retain the same percentage of fused content. For example, when the amount of small particulate metal in the powder bed material is increased from 0 wt % to 30 wt %, i.e. a shift in the ratio of large to small from 1:0 to 7:3, the pulse energy used to obtain the same fused content can be 20% lower.

The large particulate metal and the small particulate metal can be produced using any manufacturing means. However in one example the large particulate metal and/or the small particulate metal can be manufactured by a gas atomization process. During gas atomization a molten metal is atomized by inert gas jets into fine metal droplets that cool while falling in an atomizing tower. Gas atomization can allow for the formation of mostly spherical particles. In yet another example, the large particulate metal and/or the small particulate metal can be manufactured by a liquid atomization process.

Turning now to the material set. In one example the material set can include a powder bed material and a fluid. The powder bed material can be as described above. The fluid can be used to define the structure of the powder bed material that can become fused. In one example, the fluid can be applied to the powder bed material to provide selective fusing properties to a first portion of the powder bed material in contact with the fluid relative to a second portion of the powder bed material that is not in contact with the fluid.

For example, the fluid can be deposited on a layer of the powder bed material and can substantially remain on top of the powder bed material. When the first portion of the powder bed and the fluid are irradiated by a light source having a pulse energy 15 $J/cm^2$ to 50 $J/cm^2$ and positioned within 5 mm to 150 mm away from the powder bed, the first portion can become fused together and the second portion can remain unfused. In another example, when the second portion of the powder bed and the fluid are irradiated by a light source having a pulse energy 15 $J/cm^2$ to 50 $J/cm^2$ and positioned within 5 mm to 150 mm away from the powder bed, the first portion can become fused together and the second portion can remain unfused. In some examples, when one of the first portion or the second portion can become fused, and the other of the first portion or the second portion can remain unfused, a layer of a 3-dimensional part that can be formed can have a fused cross-sectional area ranging from 30% to 100%.

The ability of the fluid to assist in the fusing or inhibit fusing of the large particulate metal and/or small particulate metal can be based on the properties of the fluid. For example, the fluid can assist in the fusion when the fluid incorporates an absorptive material, a fusing reflective material, etc. In one example, the fluid can be inkjettable or ejectable from fluid ejecting architecture. An example fluid can include a liquid vehicle and carbon particles capable of strong absorption and transferring the heat to adjacent metal particles as a fusing agent to lower the irradiated energy for causing sintering and/or melting of the outer layer of the metal particles. Thus, fluids that act as an assistor can be used in a positive printing process to lay down a positive printing pattern related to a desired fusible layer pattern. Fluids that act to inhibit fusion can be used in a negative printing process to lay down a negative printing pattern related to a desired fusible layer pattern.

In further detail regarding negative printing processes, the fluid can inhibit fusion of the large particulate metal and small particulate metal. For example, the fluid can include a non-fusing absorptive material, a non-fusing reflective material, or a material that chemically or physically inhibits the large particulate metal and/or the small particulate metal from fusing. In one example, the fluid can be a white ink that includes a reflective additive, such as titanium dioxide. The titanium dioxide can act as a fusing masking agent to prevent or raise the irradiated energy needed for sintering and/or melting of the outer layer of the metal particle for fusing, for example. White ink in combination with the reflective additive can reflect electromagnetic radiation in UV, visible, and near IR regions. In another example, materials within the fluid can act as a dielectric mirror and shield the underlying large and small particulate metal. In yet other examples, the inhibiting material can include a material that absorbs photonic energy but does not fuse and act as a thermal insulator. These materials can include polymers, latexes, and the like that can absorb electromagnetic ration and/or melt or evaporate thus shielding the underlying large and small particulate metal in the powder bed material. In yet another example, a high melting temperature ceramic slurry can be used to coat particles and thus prevent their flash molten regions from joining together forming physical bond. Fluids that act as an inhibitor can be used in a negative printing process to lay down a negative of the desired layer.

Figure 3:
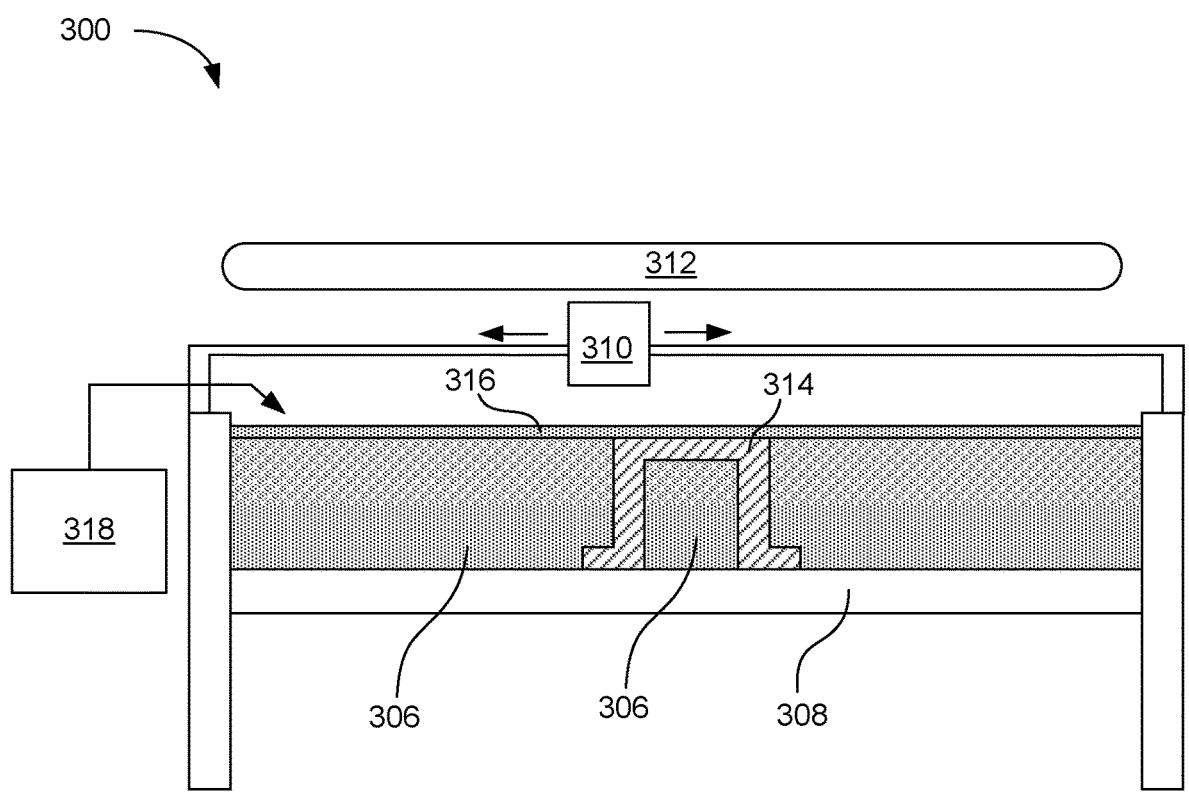
FIG. 3 schematically displays an exemplary 3D printing system in accordance with the present disclosure.

Further presented herein is a 3D printing system. The 3D printing system 300 can include a powder bed material 306, a powder bed 308, a fluid ejector 310, a light source 312, and a powder material source 318, for example. See FIG. 3. For reference, a printed article 314 is also shown in FIG. 3 that can be printed using a layer by layer printing process. As shown, the powder bed material can support each layer of the article during printing. During the printing process, the powder source can spread a thin layer of powder be material 318, e.g., from 50 µm to 200 µm, in the powder bed. Then the fluid ejector can eject a fluid over selected surface regions of the powder bed material and the light source can provide a pulsed light energy sufficient to generate heat at the powder bed material and fluid at the powder bed. A portion of the powder bed material can become sintered or melted. The powder bed material can be as described above. The powder bed can be for receiving the powder bed material and can successively drop following the formation of each layer to allow for the formation of subsequent layers of the article to be built on top of one another. The fluid ejector can be operable to selectively deposit a fluid onto the powder bed material contained in the powder bed. The fluid ejector can be operable to selectively apply a pattern of fluid on to the powder bed material. In some examples, the 3D printing system can include multiple fluid ejectors. For example, the fluid ejector can include a fluid injector to selectively eject an assisting fluid and a second fluid ejector to selectively eject an inhibiting fluid on to the powder bed material. The fluid ejector can be any type of printing apparatus capable of selectively applying the fluid. For example, the fluid ejector can be an inkjet, a sprayer, or a combination thereof. The fluid ejected by the fluid ejector can be as described above.

The light source can generate a pulse energy that can be sufficient to sinter or melt a portion of the large particulate metal, as well as to also sinter or even melt a portion of the small particulate metal. For example, the light source can be a non-coherent light source such as a pulsed gas discharge lamp. In further detail, the light source can be a commercially available xenon pulse lamp. The light source can be capable of emitting a pulse energy ranging from 15 J/cm$^2$ to 50 J/cm$^2$. In yet another example, the light source can be capable of emitting a pulse energy ranging from 20 J/cm$^2$ to 45 J/cm$^2$. In one example the light source can be positioned at from 5 mm to 150 mm, 25 mm to 125 mm, 75 mm to 150 mm, 30 mm to 70 mm, or 10 mm to 20 mm away from the powder bed during operation.

The powder bed material, material set, and 3D printing system herein can be used to create a 3D printed article. The printed article can have a fused content ranging from 30% to 100%. In some examples, the fused content can range from 50% to 80%, from 60% to 80%, from 55% to 70%, or from 65% to 75%. The fused content can be estimated by photographic evidence, such as by taking a cross-sectional view of the fused article and measuring how much area of the cross-sectional image is fused and how much remains unfused, such as shown by example in FIG. 6B.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, "average aspect ratio" refers to an average of the aspect ratio of the collective particles as measured on the individual particle by the longest dimension in one direction and the longest dimension in a perpendicular direction to the measured dimension.

"Particle size" refers to the diameter of spherical particles, or to the longest dimension of non-spherical particles.

As used herein, "first" and "second" are not intended to denote order. These terms are utilized to distinguish a portion of one element from another portion of that same element.

As used herein, "unfused" refers to a powder bed material that has not been sintered or melted together, whereas "fused" refers to a powder bed particle material that has been sintered or melted together within a layer of an article.

As used herein, a fluid that provides "selective fusing properties" refers to a property of a fluid that when applied to a particle bed material either assists in fusing of the particulate bed material or inhibits fusing of the particulate bed material when the fluid and the particulate bed material are exposed to an energy source that is capable of sintering or melting the particulate bed material in the presence of the fluid or due to the absence of the fluid.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following illustrates several examples of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Flash Fusing as a Function of Pulse Energy and Particle Content

Three different powder bed materials were prepared from stainless steel particulate metals, one powder bed material prepared using only large particulate metal (100%), and two powder bed materials prepared using different blend percentages of large and small particulate metals. The large and small particulate metals had D10, D50, and D90 values as shown in Table 1, and the blend percentages were prepared as shown in Table 2.

TABLE 1

| Particle Size Distribution | | |
|---|---|---|
| | Large Particulate Metal | Small Particulate Metal |
| D10 (μm) | 18.4 | 3.2 |
| D50 (μm) | 28.4 | 9.3 |
| D90 (μm) | 41.2 | 20.1 |

TABLE 2

| Powder Bed Materials | | |
|---|---|---|
| | Large Particulate Metal (wt %) | Small Particulate Metal (wt %) |
| 1 | 100% | — |
| 2 | 90% | 10% |
| 3 | 50% | 50% |

Each of the powder bed materials were flashed fused with a single pulse for 10 ms using a commercial xenon pulse lamp at two different pulse energies, 24.9 J/cm$^2$ and 30.0 J/cm$^2$.

The fused content of the powder bed materials is shown in FIGS. 4A-4F. FIGS. 4A-4C illustrates the fused content of each of the particulate bed materials following application of 24.9 J/cm$^2$ of pulse energy. FIGS. 4D-4F illustrates the fused content of each of the particulate bed materials following application of 30.0 J/cm$^2$ of pulse energy. As illustrated in the figures, increasing the weight percentage of the small particulate metal in the powder bed material increased the amount of fusing that occurred, even with the same pulse energy applied for the same amount of time.

Example 2

Fused Content as a Function of Pulse Energy

Five different powder bed materials were prepared similar to that described in Example 1, with the relative proportions shown in Table 3 below.

TABLE 3

| Powder Bed Materials | | |
|---|---|---|
| | Large Particulate Metal (wt %) | Small Particulate Metal (wt %) |
| A | 100% | — |
| B | 95% | 5% |
| C | 90% | 10% |
| D | 75% | 25% |
| E | 50% | 50% |

Figure 5:
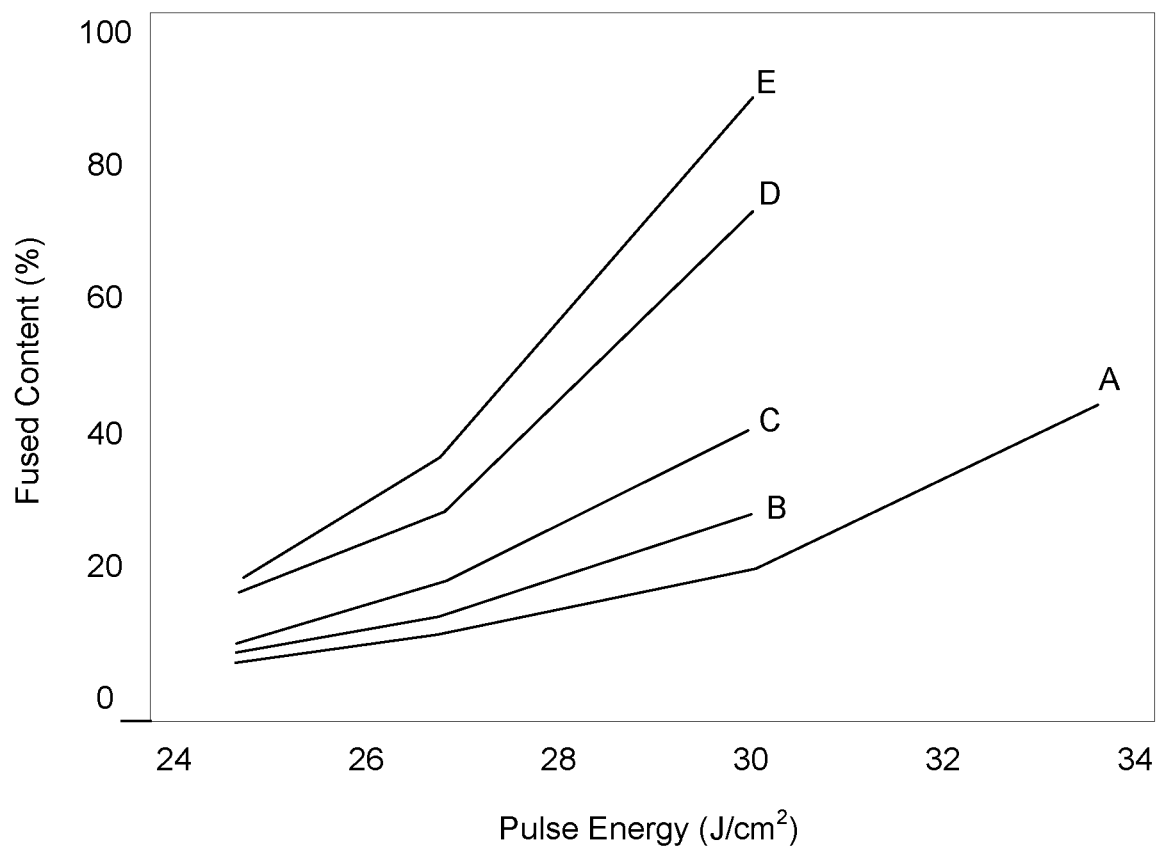
FIG. 5 graphically presents example fused content as a function of pulse energy and small particulate metal concentration in accordance with the present disclosure.

Each of the powder bed materials were flashed fused with a commercial xenon pulse lamp which applied a single 10 ms irradiation pulse having various pulse energies. The fused content of each of the powder bed materials vs. pulse energy is shown in FIG. 5. When the weight percentage of small particulate metal in the powder bed increased, the amount of pulse energy used to obtain an equivalent fused content was lower than the amount of pulse energy used to obtain an equivalent fused content of a powder bed material that contained a smaller weight percentage of the small particulate metal.

Example 3

Fused Content

Figure 6A:
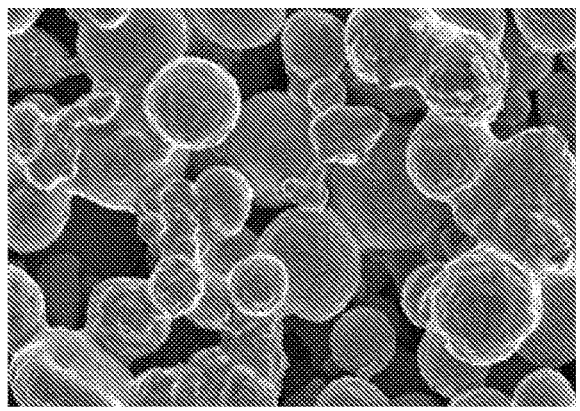
FIGS. 6A and 6B presents example fused content in a 3D article created utilizing a powder bed material in accordance with the present disclosure.
Figure 6B:
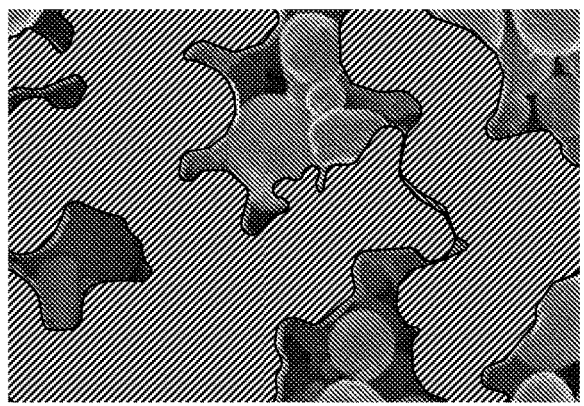

A powder bed material was prepared from 75 wt % of stainless steel large particulate metal and 25 wt % of a stainless steel small particulate metal using the methodology and particles described in Example 1. The powder bed material was flash fused with a single 10 ms pulse having energy of 29 J/cm$^2$ using a commercial xenon pulse lamp. The fused content of the powder bed material was measured using to be about 65% and is shown in FIGS. 6A and 6B.

What is claimed is:

1. A powder bed material, consisting of:
   from 85 wt % to 90 wt % of a large particulate metal having a D50 particle size distribution value ranging from 20 µm to 100 µm and an average aspect ratio from 1:1 to 1.1:1; and
   from 10 wt % to 15 wt % of a small particulate metal having a D50 particle size distribution value ranging from 5 µm to 10 µm, a D90 particle size distribution value ranging from 20 µm to 25 µm, and an average aspect ratio from greater than 1.1:1 to 2:1,
   wherein the small particulate metal sinters at a pulse energy that is lower than a pulse energy which sinters the large particulate metal; and
   wherein the large particulate metal and the small particulate metal are the same elemental metal and are selected from the group consisting of aluminum, titanium, copper, cobalt, chromium, nickel, vanadium, tungsten, tantalum, molybdenum, magnesium, silicon, gold, and silver.

2. The powder bed material of claim 1, wherein the large particulate metal has a D10 particle size distribution value from 10 µm to 30 µm, and a D90 particle size distribution value from 35 µm to 75 µm.

3. The powder bed material of claim 1, wherein the small particulate metal has a D10 particle size distribution value from 3.2 µm to 5 µm.

4. The powder bed material of claim 1, wherein the D50 particle size distribution value of the large particulate metal ranges from 40 µm to 55 µm.

5. The powder bed material of claim 1, wherein the large particulate metal is made up of metal particles of uniform shape.

6. The powder bed material of claim 1, wherein the small particulate metal is made up of metal particles of uniform shape.

7. The powder bed material of claim 1, wherein the D50 particle size distribution value of the large particulate metal is 28.4 µm, and wherein the large particulate metal further has a D10 particle size distribution value of 18.4 µm and a D90 particle size distribution value of 41.2 µm.

8. The powder bed material of claim 1, wherein the D50 particle size distribution value of the small particulate metal is 9.3 µm, and wherein the small particulate metal further has a D10 particle size distribution value of 3.2 µm.

9. A material set, comprising:
   a powder bed material consisting of:
      from 85 wt % to 90 wt % of a large particulate metal having a D50 particle size distribution value ranging from 20 µm to 100 µm and an average aspect ratio from 1:1 to 1.1:1; and
      from 10 wt % to 15 wt % of a small particulate metal having a D50 particle size distribution value ranging from 5 µm to 10 µm, a D90 particle size distribution value ranging from 20 µm to 25 µm, and an average aspect ratio from greater than 1.1:1 to 2:1,
      wherein the large particulate metal and the small particulate metal are the same elemental metal and are selected from the group consisting of aluminum, titanium, copper, cobalt, chromium, nickel, vanadium, tungsten, tantalum, molybdenum, magnesium, silicon, gold, and silver;
      and wherein the small particulate metal sinters at a pulse energy that is lower than a pulse energy which sinters the large particulate metal; and
   a fluid to apply to the powder bed material to provide selective fusing properties to a first portion of the powder bed material in contact with the fluid relative to a second portion of the powder bed material not in contact with the fluid.

10. The material set of claim 9, wherein the fluid comprises a reflective additive, an absorptive additive, or a combination thereof.

11. A three-dimensional printing system, comprising:
    a powder bed material consisting of:
       from 85 wt % to 90 wt % of a large particulate metal having a D50 particle size distribution value ranging from 20 µm to 100 µm and an average aspect ratio from 1:1 to 1.1:1; and
       from 10 wt % to 15 wt % of a small particulate metal having a D50 particle size distribution value ranging from 5 µm to 10 µm, a D90 particle size distribution value ranging from 20 µm to 25 µm, and an average aspect ratio from greater than 1.1:1 to 2:1,
       wherein the large particulate metal and the small particulate metal are the same elemental metal and are selected from the group consisting of aluminum, titanium, copper, cobalt, chromium, nickel, vanadium, tungsten, tantalum, molybdenum, magnesium, silicon, gold, and silver;
       and wherein the small particulate metal sinters at a pulse energy that is lower than a pulse energy which sinters the large particulate metal;
    a powder bed for receiving the powder bed material;
    a fluid ejector operable to selectively deposit a fluid onto the powder bed material contained in the powder bed; and
    a light source to generate a pulse energy sufficient to sinter a portion of the large particulate metal and to sinter or melt a portion of the small particulate metal.

12. The three-dimensional printing system of claim 11, wherein the pulse energy is from 15 $J/cm^2$ to 50 $J/cm^2$, and the light source is positioned within 5 mm to 150 mm away from the powder bed during operation.

13. The three-dimensional printing system of claim 11, wherein the fluid comprises a reflective additive, an absorptive additive, or a combination thereof.

* * * * *